United States Patent [19]
Jempolsky

[11] Patent Number: 5,791,292
[45] Date of Patent: Aug. 11, 1998

[54] ENCLOSURE FOR CAPTURING AND TRANSPORTING SMALL ANIMALS

[76] Inventor: Lawrence Jempolsky, 2125 Bath Ave., Brooklyn, N.Y. 11214

[21] Appl. No.: 801,147

[22] Filed: Feb. 18, 1997

[51] Int. Cl.$^6$ .................................................. A01K 1/00
[52] U.S. Cl. ........................ 119/497; 43/61; 119/482
[58] Field of Search .......................... 119/482, 491, 119/496, 497, 498, 523, 463, 472, 473, 474; 43/61

[56] References Cited

U.S. PATENT DOCUMENTS

| | | | |
|---|---|---|---|
| 1,024,441 | 4/1912 | Davis | 119/491 |
| 4,484,540 | 11/1984 | Yamamoto | 119/497 |
| 4,590,885 | 5/1986 | Sugiura | 119/497 |
| 5,016,570 | 5/1991 | Henson | 119/498 |
| 5,184,568 | 2/1993 | Healey | 119/482 |
| 5,307,758 | 5/1994 | Ho | 119/497 |
| 5,503,107 | 4/1996 | Satcher et al. | 119/496 |

FOREIGN PATENT DOCUMENTS

| | | | |
|---|---|---|---|
| 395397 | 7/1933 | United Kingdom | 119/497 |
| 2241144 | 8/1991 | United Kingdom | 119/498 |

Primary Examiner—Paul J. Hirsch
Attorney, Agent, or Firm—Patrick J. Walsh

[57] ABSTRACT

A carrier for small animals includes a removable front wall which serves as a door, as well as a removable bottom wall which serves as a sliding floor. An animal is captured by removing the sliding floor, enclosing the animal from above, and replacing the sliding floor.

4 Claims, 2 Drawing Sheets

ENCLOSURE FOR CAPTURING AND TRANSPORTING SMALL ANIMALS

BACKGROUND OF THE INVENTION

The present invention relates to carriers for small animals and particularly to a carrier for capturing and transporting a small animal such as a household cat.

The matter of placing a cat in an enclosure for transport presents potential difficulties of the cat being reluctant to be placed in the enclosure, or of the cat becoming aggressive and biting or scratching anyone attempting to enclose it.

The present invention is directed to an enclosure for avoiding these and other difficulties in capturing and enclosing a small animal for transport.

SUMMARY OF THE INVENTION

The present invention provides a carrier in the form of a box-like structure with upstanding side and rear walls, a top wall and a carrier handle affixed to the top wall. The vertical walls are provide with ventilation holes. In accordance with a preferred embodiment of the invention, the carrier includes a removable front wall which serves as a sliding door, as well as a removable bottom wall which serves as a sliding floor.

When capturing a small animal, the carrier is first prepared by placing the sliding front door in position on the carrier and removing the sliding floor. The carrier is placed bottom end first over the animal from above and when the animal is within the carrier, the sliding floor is put back into its place. The front door and sliding bottom are preferably latched to each other to secure the animal within the carrier.

The animal may be released by removing either or both the front door and the sliding bottom.

OBJECTS OF THE INVENTION

An object of the invention is to provide an enclosure for transporting small animals.

Another object of the invention is to provide an enclosure having a removable door and a removable floor to facilitate capture and transport of small animals.

Another object of the invention is to provide an enclosure for transport of small animals with removable door and floor wherein the floor and door have a cooperating latch mechanism for securing them in place.

Other and further objects of the invention will become apparent with an understanding of the following detailed description of the invention or upon employment of the invention in practice.

A preferred embodiment of the invention has been chosen for purposes of detailed description and is shown in the accompanying drawing in which.

DETAILED DESCRIPTION OF THE PREFERRED EMBODIMENT

Figure 2:
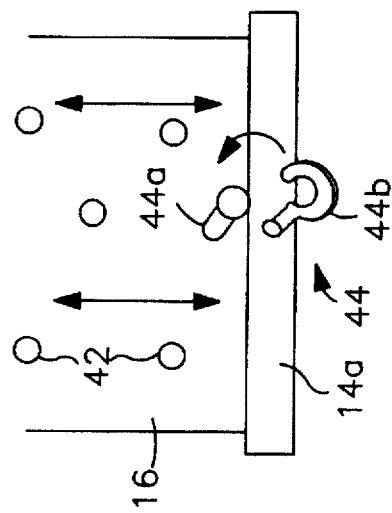
FIG. 2 is a fragmentary front elevational view of the enclosure of FIG. 1 showing a latch mechanism for securing the removable floor and removable door.
Figure 1:
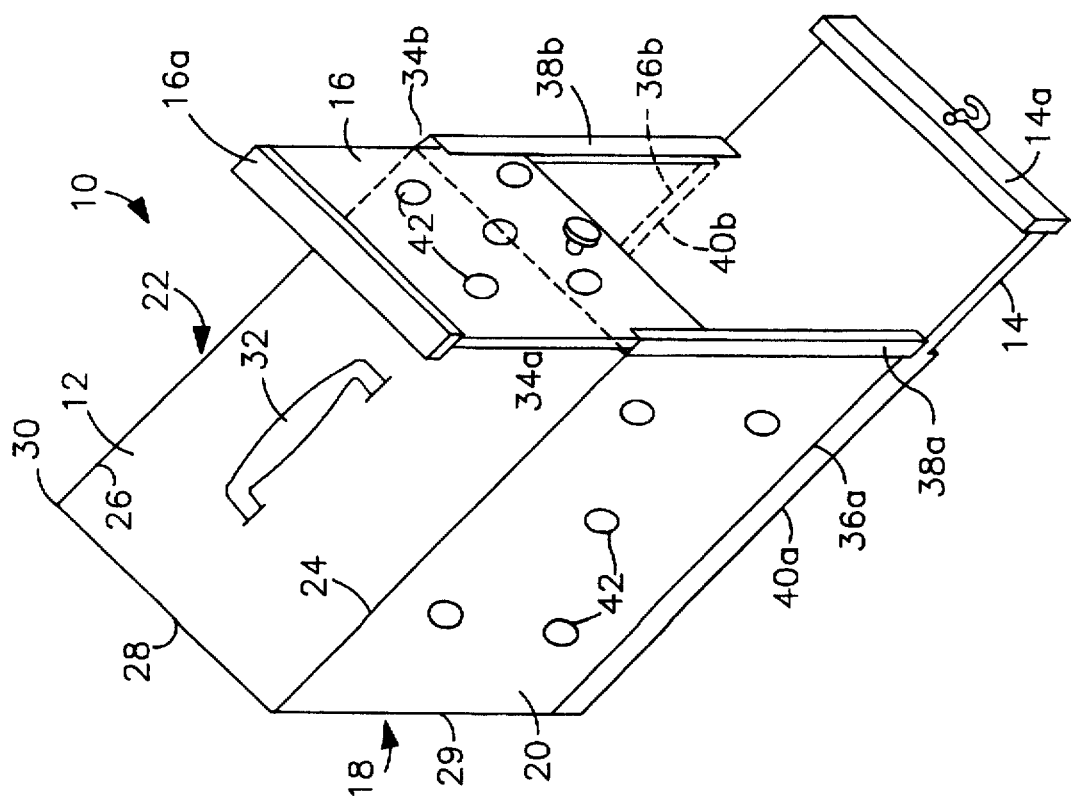
FIG. 1 is a perspective view of an enclosure according to the invention.

Referring to the drawing, a transporting enclosure or carrier 10 according to the invention comprises a box-like structure with six wall panels including top 12, bottom 14, front 16, rear 18, left 20 and right 22 side walls. Each of the panels is preferably rectangular with the top wall permanently joined along its left 24 and right 26 edges to the upper edges of the left and right side walls. The rear wall is permanently secured to the mating edges 28–30 of the top wall as well as the left and right side walls.

A carrying handle 32 is secured to the top wall.

The front 34a–b and bottom edges 36a–b of the left and right side walls are fitted along their entire lengths with first 38a–b and 40a–b second means, respectively, preferably in the form of channel members for slidably receiving a removable front door 16 and a removable bottom wall or floor 14. The front door and bottom panel channel members are pairs of parallel, U-shaped strips with confronting openings for slidably receiving their respective wall members.

The leading edges of the floor and door panels are fitted with grip bars 14a, 16a to aid in gripping and moving the panels.

The walls of the carrier are provided with ventilation openings 42.

The carrier is provided with a latch mechanism 44 including a knob 44a projecting from the lower reach of the front door, and a hook 44b for engaging the knob pivotally mounted on the gripping bar of the sliding floor.

Figure 3:
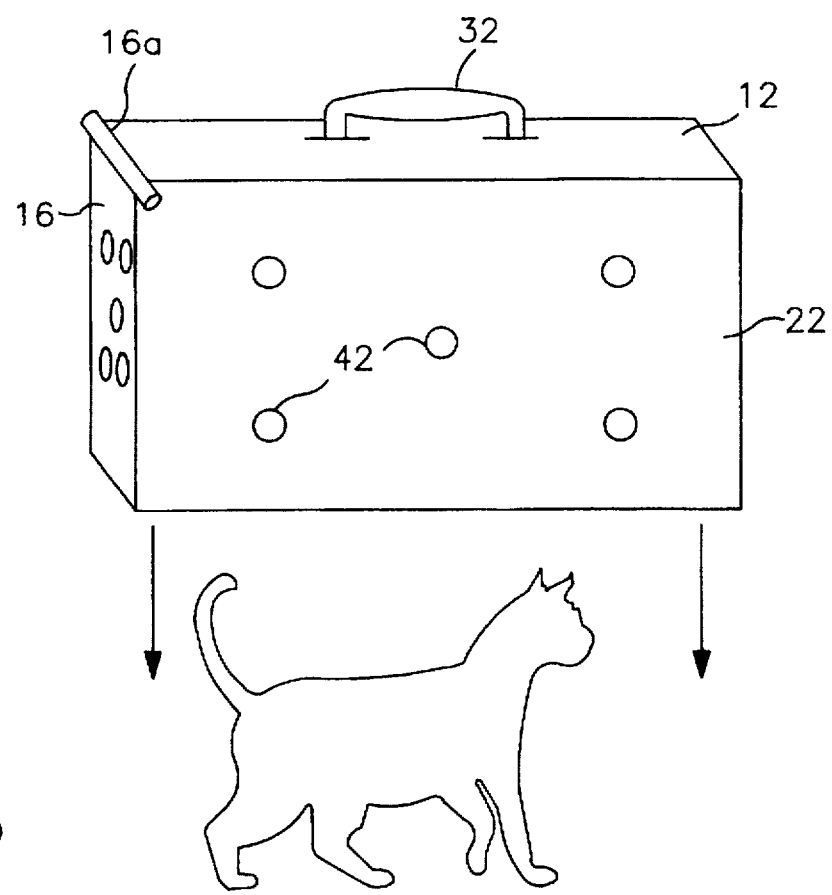
FIG. 3 is a perspective view of the enclosure of FIG. 1 with floor removed for capturing a small animal.

As shown in FIG. 3, the carrier is used to capture a small animal with the floor removed and with the front door in place. The carrier is moved down over the animal for enclosure and capture. Next the floor panel is replaced and latched to the front door. The carrier is now arranged for transporting the animal.

Various changes may be made to the structure embodying the principles of the invention. The foregoing embodiments are set forth in an illustrative and not in a limiting sense. The scope of the invention is defined by the claims appended hereto.

I claim:

1. A carrier for small animals comprising a box-like structure having top, rear, left and right side walls, a removable bottom panel, and a slidably removable front panel, the top wall joined to the left and right side walls, the rear wall secured to the top wall and to the left and right side walls, the top, rear, and left and right side walls so connected defining a carrier with an interior chamber for receiving a small animal, and further defining a carrier with an open front and an open bottom, a carrying handle secured to the top wall, the left and right side walls each having a front edge and a bottom edge, first means fitted to the front edges of the left and right side walls for slidably receiving the front panel defining a door for closing the front of the carrier, and second means fitted to the bottom edges of the left and right side walls for removably receiving the bottom panel for defining a floor for closing the bottom of the carrier whereby a small animal may be captured by closing the front of the carrier, removing the bottom panel from the carrier, enclosing a small animal in the chamber by moving the carrier bottom first down over the animal, and replacing the floor to confine the animal within the carrier chamber.

2. A carrier as defined in claim 1 in which the first and the second means comprise first and second sets of channel members lying respectively along the front edges and along the bottom edges of the left and right side panels, with the first set of channel members cooperating to slidably receive the front panel and the second set cooperating to slidably receive the bottom panel.

3. A carrier as defined in claim 1 which further includes latch means for securing the bottom panel to the front panel when both are in place on the carrier.

4. A carrier for small animals comprising a box-like structure having top, rear, left and right side walls, a removable bottom panel, and a front panel, the top wall joined to the left and right side walls, the rear wall secured to the top wall and to the left and right side walls, the top, rear, and left and right side walls so connected defining a carrier with an interior chamber for receiving a small animal, and further defining a carrier with an open front and an open bottom, a carrying handle secured to the top wall, the left and right side walls each having a front edge and a bottom edge, first means fitted to the front edge of one of the left and right side walls by means of which the front panel is moved to define an opening into the interior chamber and by means of which the front panel is moved back to define a door for closing the front of the carrier, a latch for securing the front panel in closed position, and second means fitted to the bottom edges of the left and right side walls for removably receiving the bottom panel for defining a floor for closing the bottom of the carrier whereby a small animal may be captured by closing the front of the carrier, removing the bottom panel from the carrier, enclosing a small animal in the chamber by moving the carrier bottom first down over the animal, and replacing the floor to confine the animal within the carrier chamber.

* * * * *